(12) United States Patent
Pappas et al.

(10) Patent No.: US 6,925,870 B2
(45) Date of Patent: Aug. 9, 2005

(54) ULTRASONIC FILL LEVEL DEVICE AND METHOD

(75) Inventors: Richard A. Pappas, Richland, WA (US); Don S. Daly, Richland, WA (US); Walter C. Weimer, Richland, WA (US); James L. Buelt, Richland, WA (US); Kayte M. Judd, Richland, WA (US); Scott K. Cooley, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 10/668,853

(22) Filed: Sep. 23, 2003

(65) Prior Publication Data

US 2005/0072226 A1 Apr. 7, 2005

(51) Int. Cl.⁷ .............................................. G01F 23/00
(52) U.S. Cl. ........................................................ 73/290 V
(58) Field of Search ...................... 73/290 V; 342/124; 367/908; 324/637, 644

(56) References Cited

U.S. PATENT DOCUMENTS 5,438,868 A * 8/1995 Holden et al. ............ 73/290 V
5,697,248 A   12/1997 Brown
5,836,192 A   11/1998 Getman et al.
6,234,023 B1 * 5/2001 Collins et al. ................. 73/597
6,236,142 B1   5/2001 Durkee
6,581,459 B1 * 6/2003 Lichtenfels, II ........... 73/290 V
6,650,280 B2 * 11/2003 Arndt et al. ................. 342/124

FOREIGN PATENT DOCUMENTS

DE       19643956    5/1998
GB        2076536   12/1981
WO      WO9627120    9/1996

* cited by examiner

*Primary Examiner*—Hezron Williams
*Assistant Examiner*—Tamiko Bellamy
(74) *Attorney, Agent, or Firm*—Woodard, Emhardt, Moriarty McNett & Henry LLP

(57) ABSTRACT

A fluid level monitoring system 20 includes an ultrasonic interrogation device 30 acoustically coupled to a sidewall 25 of container 22 and produces ultrasound that travels through the liquid 24 along a transverse path 32 and an inclined path 34. The liquid level is determined by calculating the times-of-flight for the received return signals, where the return signal along the inclined path 34 reflects from the intersection 27 of the liquid level 28 and a sidewall 23. The device 30 can be a multi-element transducer having a plurality of transducer elements at different angular orientations in a common housing.

34 Claims, 5 Drawing Sheets

ULTRASONIC FILL LEVEL DEVICE AND METHOD

FIELD OF THE INVENTION

The present invention relates generally to the field of liquid level monitoring and more particularly relates to systems and methods for use in ultrasonically monitoring the fill level of a liquid storage container.

BACKGROUND

There is a widespread need to monitor the fill level of liquid containing vessels, and there are a variety of ultrasonic level monitors adapted for this purpose. However, many ultrasonic level monitors are invasive, requiring placement of some hardware in contact with the liquid inside the tank and requiring a connection to that hardware which breeches the tank. Others merely provide crude or limited information about the fill level, for example by simply determining whether a particular location inside the tank is wet or dry. Still others require hardware placed at more than one location, adding to equipment cost. The ultrasonic monitoring techniques currently available thus fail to provide a reliable, accurate, and non-invasive sensor that is easily installed at a single point on the exterior of the storage tank. More clearly, there is a need for a non-invasive, self-correcting, ultrasonic liquid level monitor (ULLM) that is inexpensive and can be easily installed, maintained and operated. In one form, the present invention meets this need. Other forms of the invention provide additional benefits and advantages in a novel and unobvious manner.

SUMMARY

The present invention relates generally to systems and methods for ultrasonically determining the liquid fill level of a container. While the actual nature of the invention covered herein can only be determined with reference to the claims appended hereto, certain forms of the invention that are characteristic of the embodiments disclosed herein are described briefly as follows.

In one form of the present invention, a system for determining the liquid fill level of a container is comprised of one or more ultrasound transducers and a processing device. The transducers are acoustically associated with a sidewall of a container and are positioned to interrogate the liquid with ultrasound and receive responses. A first received response corresponds to ultrasound reflected from an opposite sidewall along a generally horizontal acoustic path through the liquid, and a second received response corresponds to ultrasound reflected from a "corner" along a generally inclined path through the liquid, wherein a "corner" refers to the intersection between the liquid surface and a sidewall of the container. The processing device calculates time-of-flights and determines height of the liquid surface relative to the location of the transducers. The transducers can include a multi-element transducer having a plurality of transducer elements positioned in differing angular orientations in a common housing.

In another form a method for determining the level of the contents in a container comprises interrogating a container with ultrasound with one or more ultrasonic transducers in acoustic contact with a sidewall of the container at a transducer location; receiving a first response corresponding to ultrasound reflected from an opposite sidewall along an acoustic path that is substantially independent of the height of the surface; receiving a second response corresponding to ultrasound reflected from an intersection between the upper surface and a sidewall of the container; and determining a relative height of the upper surface from the first and second responses.

It is one object of the present invention to provide improved systems and methods for use in non-invasively determining the liquid fill level of containers.

Further objects, features, advantages, benefits, and further aspects of the present invention will become apparent from the drawings and description contained herein.

DESCRIPTION OF THE ILLUSTRATED EMBODIMENTS

Figure 1:
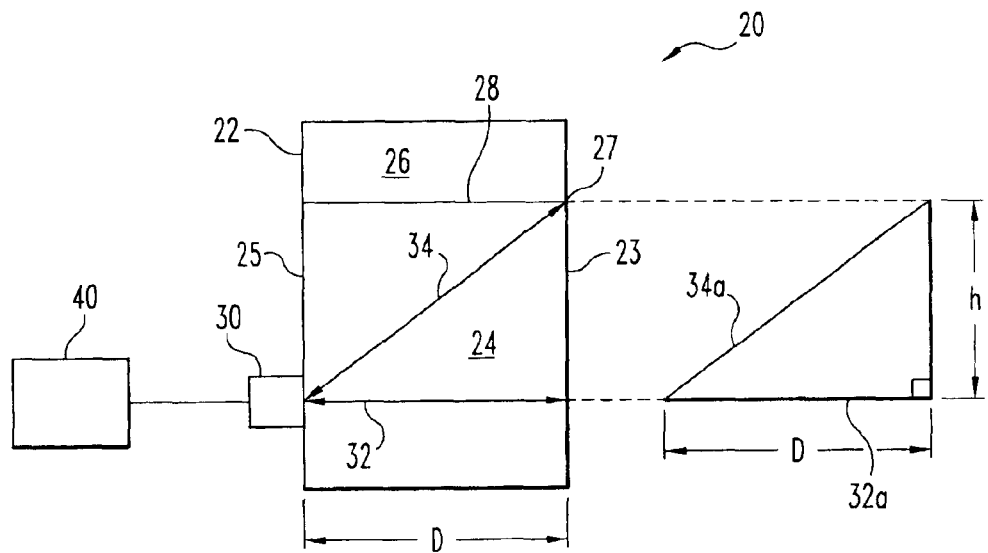
FIG. 1 is a schematic illustration of a fill level monitoring system.

For the purposes of promoting an understanding of the principles of the invention, reference will now be made to the embodiments illustrated in the drawings and specific language will be used to describe the same. It will nevertheless be understood that no limitation of the scope of the invention is hereby intended. Alterations and further modifications in the illustrated devices, and such further applications of the principles of the invention as illustrated herein are contemplated as would normally occur to one skilled in the art to which the invention relates.

Briefly, in one aspect the present invention provides a system for monitoring the fill level of a container based on the detection of ultrasound that reflects obliquely from a "corner" of the container and transversely from the far sidewall. This "corner" refers to the intersection of the fill level and a sidewall of the container, and because the fill level is determined by the interface between the fill contents (typically a liquid) and the material above the contents (typically a gas forming a headspace), this "corner" is actually the three-way intersection of the sidewall, the liquid and the gas. As described more fully below, from a time-of-flight measurement of the "corner-shot" reflection and information about speed of sound in the liquid obtained from the transverse reflection and the dimensions of the container, one can mathematically determine the fill level. One advantage of this system is that all the acoustic measurements, the corner-shot reflection and the measurement of the speed of sound, can be taken from a single location on the exterior of the container.

Referring to FIG. 1, schematically shown therein is a fluid level monitoring system 20 for ultrasonically determining the level of liquid 24 in container 22. An ultrasonic interrogation device 30 is acoustically coupled to sidewall 25 of container 22 and is operable to produce ultrasound that travels through the liquid 24 along at least two different acoustic paths 32 and 34. The first acoustic path 32 is a transverse path that is generally horizontal and generally perpendicular to the plane of the sidewall 23. The second acoustic path 34 is an oblique path which is inclined through the liquid 24 and which spans between the device 30 and the intersection 27 between the upper liquid surface 28 and sidewall 23. In the illustrated embodiment, container 22 is a cylindrical container, such as a drum, and sidewalls 23, 25 are substantially vertical and concave interior surfaces of the drum.

Surface 28 is conventionally defined as the interface between the liquid 24 and the material 26 above the liquid 24, and it is the relative height of surface 28, and consequently the position of the intersection 27, that indicates the liquid level of interest. While the contents of the container are herein referred to as a liquid, it is to be understood that the liquid 24 can be any fluid or fluid-like material that only partially fills container 22 and supports propagation of longitudinal ultrasonic waves, including liquids, pastes, sludges, and slurries. The material 26 above the liquid 24 is generally a gas but it can be any material, or combination of materials including another liquid, that establishes a ultrasonically reflective interface with liquid 24 and fills the remainder of the container 22. In certain applications, an intervening material, such as another liquid, might separate the material 26 and the liquid 24 such that a level measured is the interface between the liquid 24 and this intervening material. For example, oil might be provided between the liquid 24 and headspace material 26. In a variation, liquid 24 is stratified and the fill level monitoring device monitors the location of multiple interfaces between the stratified layers by detecting reflections from each of the different corners.

Figure 2:
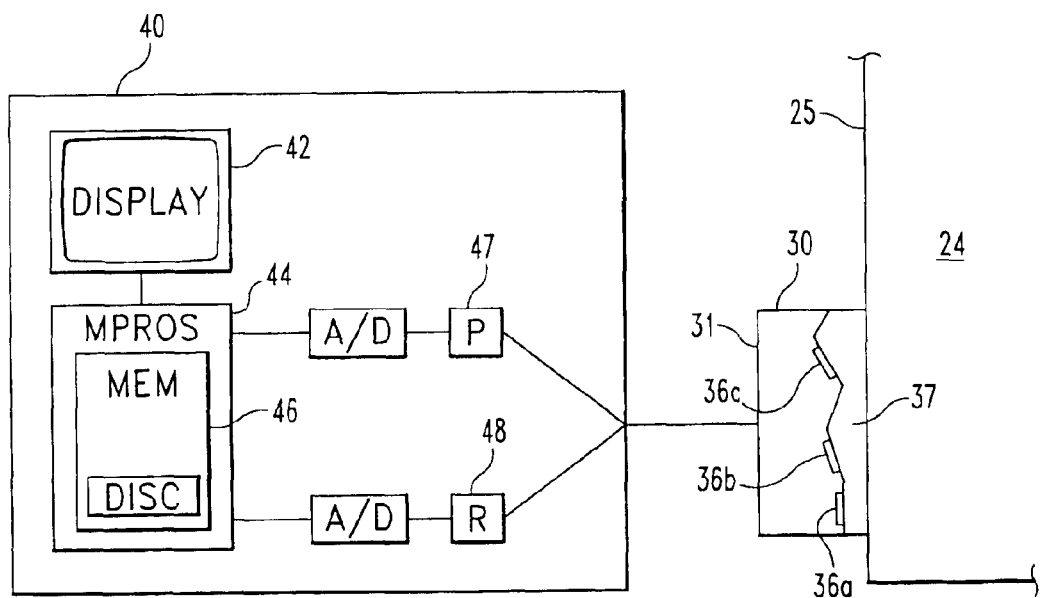
FIG. 2 is a schematic illustration of additional features of the FIG. 1 system.

The interrogation device 30 functions as both the transmitter and receiver for the ultrasonic signals that traverse paths 34 and 32. With reference to FIG. 2, the interrogation device 30 includes one or more transducers 36 in acoustic communication with the liquid 24. Device 30 is illustratively represented with three transducers 36a, 36b, 36c contained within a common housing 31. The transducers 36a–36c are each positioned at different orientations for transmitting and receiving ultrasound along the different acoustic paths 32, 34.

Device 30 is electronically connected to computer system 40 which controls the ultrasonic interrogation and processes the received response to determine the relative location of intersection 27, and thus the liquid level of interest. Computer system 40 includes a microprocessor 44 coupled to a pulser 47 and receiver 48 through appropriate analog to digital (A/D) converters. In operation, pulser 47 generates and delivers a short duration stimulus to one of the transducer 36a, 36b, or 36c, and the transducer responds to the stimulus by emitting a pulse of ultrasound into the liquid 24. A suitably short pulse might have a pulse length less than about 2.0 cm in the liquid 24. This ultrasonic pulse propagates through liquid 24, and at least a portion of the energy of the pulse returns to the transducer having traversed along one or more of paths 32 or 34. The transducer responds to the return energy, producing an output signal that is amplified, digitized and passed to the microprocessor 44 for time-of-flight determination and further processing according to programming instructions contained in memory 46.

Figure 3:
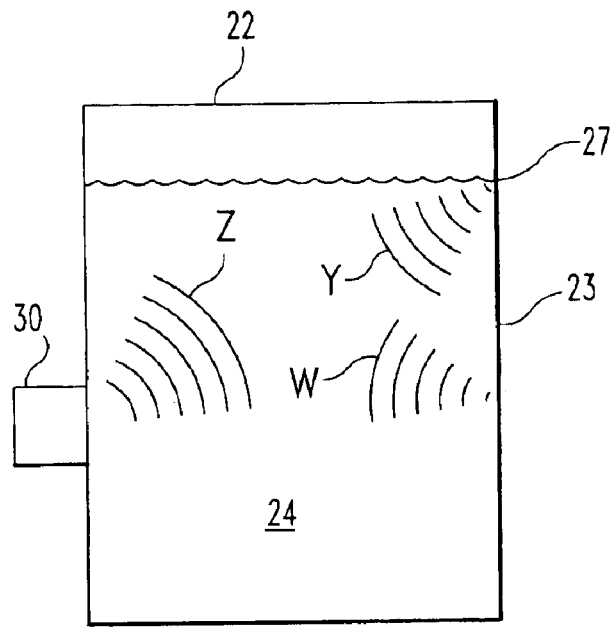
FIG. 3 is a schematic illustration of an ultrasonic wavefront originating from the interrogation device and reflecting from the corner and the opposite wall in the FIG. 1 system.
Figure 4:
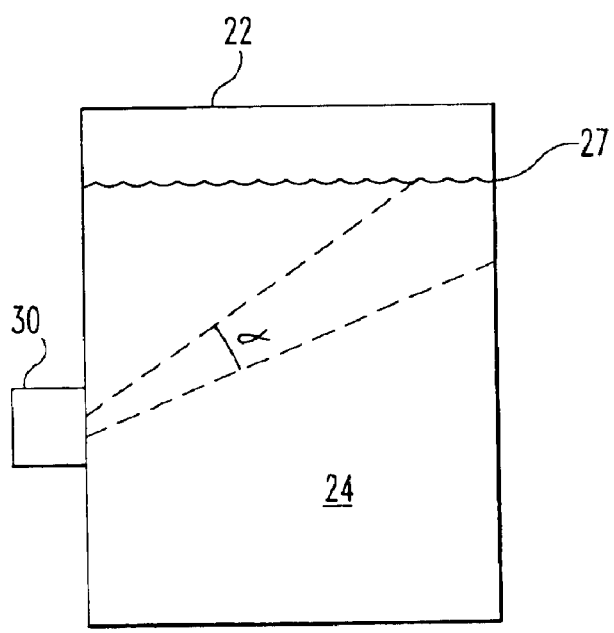
FIG. 4 is an illustration of the divergence of ultrasound directed toward the corner of the FIG. 1 system.

Device 30 can be configured to produce different types of ultrasonic interrogation. FIG. 3 illustrates a form of interrogation where an interrogation pulse Z is wide (i.e. has a wide angle of divergence or dispersion) or is unidirectional such that it generates return echoes W, Y both from the corner 27 and a spot on opposite wall 23 that is independent of the liquid level. Where the interrogation is such that there are multiple distinct return signals, the multiple return signals are differentiated by recognizing that the return energy will arrive along inclined path 34 at a later time than for the horizontal path 32 when sidewall 23 is vertical (need to show 23 in FIG. 3). Alternatively or in addition, the interrogation can be directional such that the possible return paths for a given pulse are more limited. FIG. 4 illustrates a form of interrogation where an ultrasound pulse V is directional and has a characteristic divergence $\alpha$. Divergence of an ultrasound beam is conventionally defined relative to a point in the far field as the angle of the cone bounding the region where the ultrasonic signal has diminished in intensity by half relative to the peak signal along the transducer centerline. Where the transducers are directional, horizontal transducer 36a is utilized to transmit and receive the pulse along the horizontal path 32 and inclined transducers 36b and 36c are used to transmit and receive the pulse along the inclined path 34.

The determination of the liquid level is achieved by calculating the times-of-flight for the received return signals. Because the horizontal dimension D of the container 22 is known, the speed of sound in the liquid 24 can be calculated from the time-of-flight for path 32. From this calculated speed of sound, the length of the inclined path 34 can be calculated based on its determined time-of-flight. The height of the liquid level 28 is then determined by calculating the altitude h of the right triangle having hypotenuse 34a and leg 32a corresponding to the lengths of paths 34 and 32 respectively. Alternatively, if the dimension D is unknown but the absolute level of fill is initially known, the altitude h may also be determined. In still further variations, if the dimension D is unknown but the relative level of fill is initially known, the relative altitude h may be determined. In one implementation, computer system 40 calculates the liquid level and provides a corresponding indication on display 42. Other implementations include wired or wireless transmission of the liquid level from the computer system 40 to a remote computer (not shown), for example to control the level of contents in the container 22, having the computer system 40 signal an alarm condition as appropriate, and combinations thereof.

It will be appreciated that this height measurement does not measure the absolute height of the liquid 24 in the container 22, but rather the height of the surface 28 above the location of device 30. However, because the location of device 30 is known, relative to the bottom of the container, one can readily determine the height of the liquid relative to the base of the container. The use of gradations or external markings on the container 22 can be employed to assist determining the location of the device 30 relative to the bottom of the container. Such external markings would be particularly useful in the case where device 30 is a handheld device or otherwise moveable and subject to placement at different locations along the side of a single container 22 and/or as between several containers.

Of course, in certain expected applications, the location of intersection 27 and thus the precise location of the corner shot reflection (path 34) is not known in advance, but rather is dependent on the fill level to be determined. The present invention takes advantage of the recognition that, for ultrasound propagating in an inclined direction from a fixed location on the side of the container, the portion that reflects from a "corner" will generate the strongest signal. Excluding the transverse reflection, it will also generate the earliest return signal. Even where this "corner-shot" reflection involves intermediate reflections from one or more of the sidewalls 23, 25 before and after reaching the corner intersection 27 (see FIG. 5), the straight line path will pass through the corner, allowing calculation of the height h according to the right triangle relationship of FIG. 1.

Figure 5:
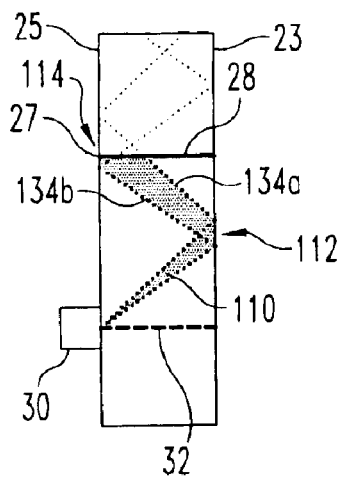
FIG. 5 is a schematic illustration of a divergent ultrasound beam inside a container that produces a corner-shot reflection after reflection off the opposing sidewall.
Figure 6:
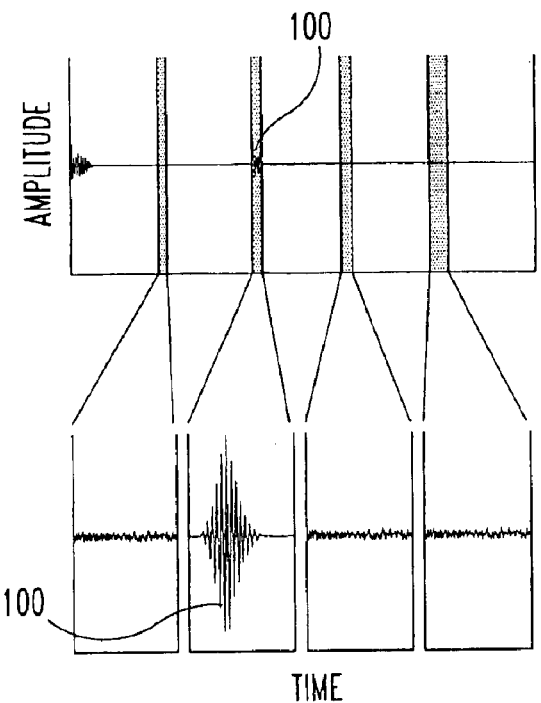
FIG. 6 is an exemplary plot of amplitude at device 30 after delivery of an ultrasound burst in the beam as illustrated in FIG. 5 with exploded regions corresponding to the range of expected times for receipt of the corner shot reflection.

An exemplary ultrasound trace for the corner shot reflection is shown in FIG. 6. The trace of FIG. 6 corresponds to the interrogation depicted schematically in FIG. 5 where a divergent beam 110, originates as a pulse from device 30 and reflects once off the side wall 23 before reaching corner 27. Based on the known orientation and divergence of the beam 110, the beam 110 can be predicted to propagate substantially between upper 134a and lower 134b bounds. Based on the calculation of the bounds 134a and 164b and the known dimension of the container, the beam 110 is predicted to illuminate a predefined area 112 on the first sidewall 23, and after one reflection, a predefined area 114 on the second side wall 25. A range for the times-of-flight for the return signal from the corner-shot reflections if the liquid level 28 was in these areas 112, 114, are then determined by utilizing an estimate (or measured value) for speed of sound in the liquid. The ranges for these times-of-flight are indicated by the shaded regions of the upper plot of FIG. 6 with exploded plots of each time window provided below.

Figure 5A:
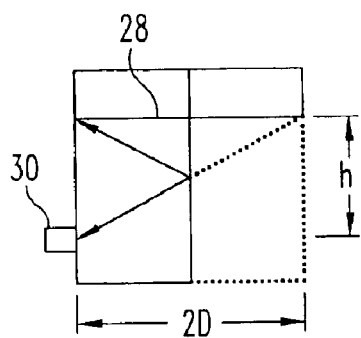
FIG. 5a is a schematic illustration of calculation of height accommodating for the reflection off the opposing sidewall.
Figure 7:
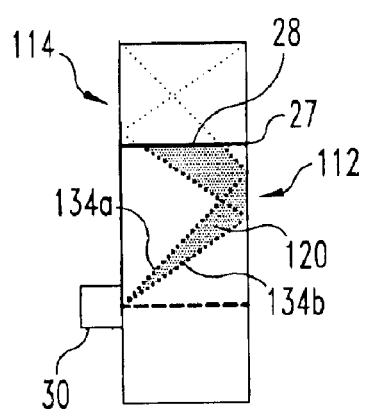
FIG. 7 is a schematic illustration of a divergent ultrasound beam inside a container that does not produces a corner-shot reflection because the liquid level is between illuminated zones.
Figure 8:
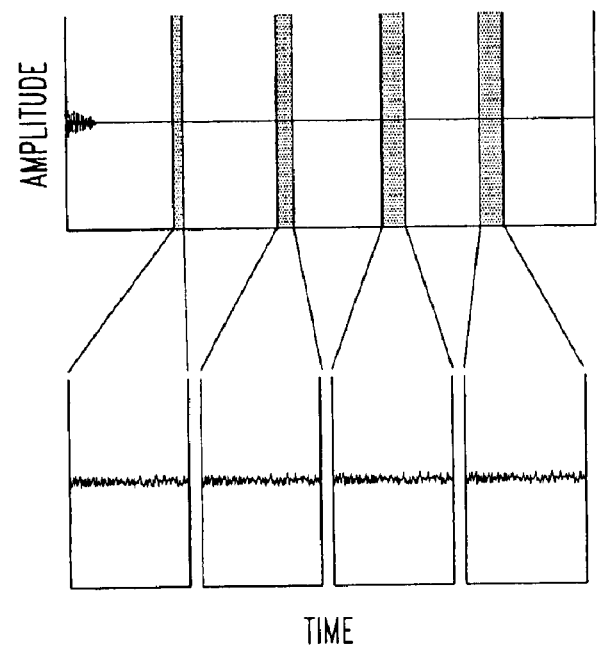
FIG. 8 is an exemplary plot of amplitude at device 30 after delivery of an ultrasound burst in the beam as illustrated in FIG. 7 with exploded regions corresponding to the expected times for receipt of the corner shot reflection.

Because a corner shot occurs after one sidewall reflection in the conditions depicted in FIG. 5, a distinct pulse is present in the second time window. The presence of this intermediate sidewall reflection is readily accounted for in determining the liquid level by doubling the length of the lower leg of the right triangle as depicted in FIG. 5a. By contrast, FIG. 7 illustrates a geometry where the liquid level 28 falls between the illuminated areas 112, 114. Accordingly no corner-shot reflection occurs for the illustrated beam, and the exploded windows of FIG. 8 do not show a discernible return pulse.

The ability to detect the liquid level depends on the relative size and orientation of the sidewall areas that are illuminated by the ultrasound (112 and 114, for example). In one form, large areas of illumination are achieved by interrogating with non-directional ultrasound, such as with a mechanical impactor, or with a beam having a wide angle of dispersion. In another form, large areas of illumination are achieved by utilizing multiple transducers, each having a relatively narrow angle of dispersion. Because the strength of the return signal depends on the amount of energy reflecting off the corner (or off the sidewall in the case of the horizontal path 32), use of narrow beams can provide more focused energy, for example to penetrate large distances or through highly attenuating material. For example, it is expected that a series of transducers with angular divergence between 15–35 degrees in the liquid will be useful in a variety of industrial applications.

The device 30 of FIG. 1 includes three transducers 36a–36c each positioned a different angular orientation, but it is to be understood that more or less transducers could be used. The transducers 36a–36c are mounted on one or more wedge pieces 37 of solid material that serve to orient the transducers and acoustically couple them to the sidewall 25 when the housing 30 is placed in position. These transducers 36a–36c can each have the same or different degrees of divergence, and in one form the transducers are operated sequentially to avoid interference. When using multiple transducers, the transducers can be positioned such that they illuminate overlapping areas on the sidewalls of the container, permitting redundant level measurements for liquid levels falling in the overlapping illuminated areas.

Making a single estimate of fill level at any one point in time has been the focus of the previous discussion. In certain applications, it may be desirable to improve upon the accuracy or precision of this single point estimate of fill level. For example, the actual fill level may be constant but the single point estimate varies significantly due to measurement error. It is also possible that the amount of material may be constant, but the actual fill level may vary due to changes in air pressure, heating, cooling, or other conditions. In cases like these, improved estimates of the true fill level may be calculated by a statistical aggregation of a series of single point level estimates. For example, more recent single point estimates, or those having a higher signal to noise ratio, may be weighted heavier in a weighted mean estimate of fill level. Any useful method for applying the weights to the single point estimates can be employed. One approach to assigning weights and making the composite (weighted mean) estimate is to utilize Kalman filtering. (R. G. Brown and P. Y. C. Hwang; "An Introduction to Random Signals and Applied Kalman Filtering" John Wiley and Sons, Inc. New York, N.Y., 1996). A suitable example of the construction of a composite fill level estimate from a series of fill level estimates is described in Whitney, P. et al. "Screening the Hanford Tanks for Trapped Gas" *Environmentrics* 2002; 13(5/6)411–428, which describes the use of Kalman filtering to correct for temporal variation in fill level estimates attributable to atmospheric effects.

Figure 9:
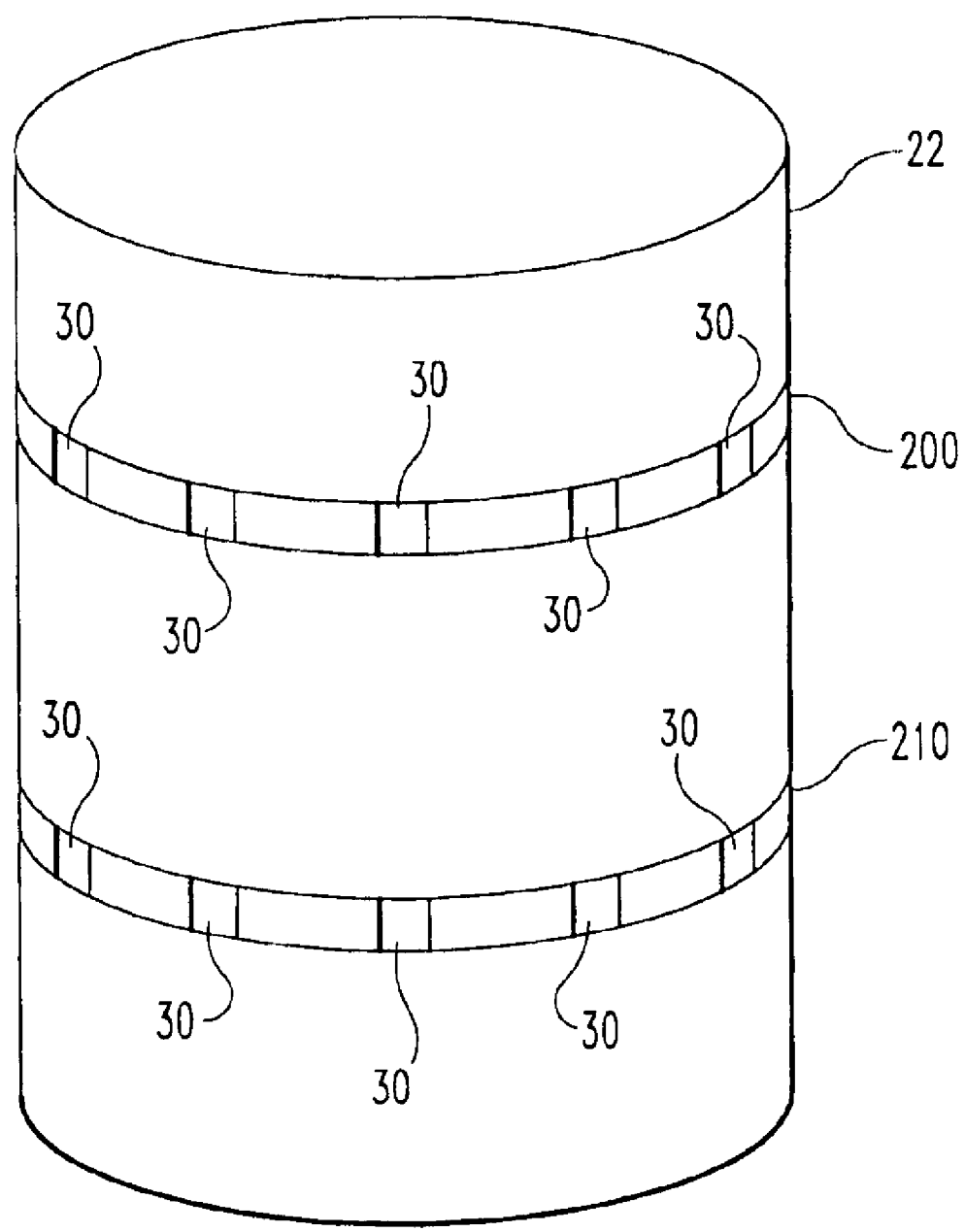
FIG. 9 is view of container with a plurality of fill level monitoring devices secured to its exterior.

Additional accuracy and redundancy can be achieved by providing multiple devices 30 on a single container. Turning now to FIG. 9, a first strap 200 secures a plurality of devices 30 to the outside of container 22. A second strap 210 secures a second plurality of devices 30 to the outside of container 22 at a position below the first strap. All of the devices 30 are coupled to a common computer (not shown) which controls the orderly interrogation of the liquid level and collects and processes the data. The straps 200 and 210 serve to secure the devices 30 to the exterior of the container 22 and apply pressure as required to form good acoustic communication. The devices 30 can be removed and secured to other containers 22 if the need arises. Alternatively, if mobility is not a concern, the devices 30 can be permanently mounted to the container 30.

In some applications, the liquid properties or composition changes over time, resulting in changes to the speed of sound. While the present invention relies on time-of-flight calculations, it will be appreciated that the measurement of the horizontal pulse 32 provides self calibration to accommodate such changes. Where such changes are not an issue, the horizontal pulse 32 can be eliminated and replaced with user defined parameters.

The frequency of the ultrasound used for the interrogation will depend on the materials of interest. The selection of frequency will also depend on the size and geometry of the storage tank. The frequency selected is optimized for three parameters: transit time resolution, penetration, and beam divergence. Although the method is not limited to lower frequencies, one preferred system employs audible signals in the range of 15 kHz to 25 kHz that are combined with pulse compression signal processing methods to allow for extended penetration and high return (echo) signal.

Signal pulse compression methods can be applied to optimize the signal-to-noise and the time-of-flight resolution. For example, the transmitted signal may incorporate a predetermined range of frequencies, for example taking the form of a sine wave with continuously varying frequency conventionally referred to as a broadband frequency sweep. This approach uses a signal of wide bandwidth and long duration, a technique that is often used in radar applications, for example. The received signal is then cross-correlated with the transmitted signal to determine the time-of-flight. The cross correlation of the received signal with the transmitted signal achieves a high signal to noise ratio and provides an accurate transmit signal arrival time.

An alternative pulse compression technique is the use of amplitude modulation to digitally encode a signal on a carrier frequency. In one application of this technique a distinctive binary phase shift modulated tag is digitally encoded in each pulse to uniquely identify its source transmitter. Such unique identification is particular useful in embodiments that utilize a multitude of transmitters and receivers. An analog, heterodyne receiver may be used to remove the high frequency carrier signal. This setup allows measurements to be made rapidly without resorting to extremely high speed digitization. The carrier signal may also be removed in software code using digital signal processing techniques directly on the received signals. As with other pulse compression techniques, the cross correlation of the received signal with the transmitted signal results in mostly signal contributions related to the encoded information and very little contributions from random, or white noise in the received signal, providing relatively high signal to noise and accuracy. Further details of pulse compression techniques useful in obtaining accurate and reliable information in the present invention can be found in Gan, T. H., Hutchins, D. A., Billson, D. R., and Schindel, D. W., "The use of broadband acoustic transducers and pulse-compression techniques for air-coupled ultrasonic imaging," *Ultrasonics* 39, 181–194 (2001); and Lam, F. K., and Hui, M. S., "An ultrasonic pulse compression system for non-destructive testing using minimal-length sequences," *Ultrasonics*, p. 107–112 (1982).

CLOSURE

While the invention has been illustrated and described in detail in the drawings and foregoing description, the same is to be considered as illustrative and not restrictive in character. Only certain embodiments have been shown and described, and all changes, equivalents, and modifications that come within the spirit of the invention described herein are desired to be protected. All publications, patents, and patent applications cited in this specification are herein incorporated by reference to the extent not inconsistent with the present disclosure as if each were specifically and individually indicated to be incorporated by reference and set forth in its entirety herein. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding. Thus, the specifics of this description and the attached drawings should not be interpreted to limit the scope of this invention to the specifics thereof. Rather, the scope of this invention should be evaluated with reference to the claims appended hereto. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary. Likewise, where the term "input" or "output" is used in connection with reference to an electronic device, it should be understood to comprehend singular or plural and one or more signal channels as appropriate in the context.

What is claimed is:

1. A method for determining the level of the contents in a container comprising:

interrogating a container with ultrasound with one or more ultrasonic transducers in acoustic contact with a sidewall of the container at a transducer location below the upper surface of the contents of the container;

receiving a first response to the interrogating with the one or more transducers corresponding to ultrasound reflected from an opposite sidewall of the container along an acoustic path through the liquid that is substantially independent of the height of the upper surface;

receiving a second response to the interrogating with the one or more transducers corresponding to ultrasound reflected from an intersection between the upper surface and a sidewall of the container; and determining a value corresponding to height of the upper surface relative to the transducer location from the first and second responses.

2. The method of claim 1 wherein the interrogating includes sequentially:

a) interrogating along a generally horizontal axis; and b) interrogating along at least one inclined axis.

3. The method of claim 2 wherein b) interrogating along at least one inclined axis includes interrogating along at least two non-parallel inclined axes.

4. The method of claim 2 wherein interrogating along at least one inclined axis includes producing an ultrasonic beam along at least one inclined axis having a divergence of between about 15 and 35 degrees in the contents of the container.

5. The method of claim 1 wherein the interrogating includes producing at least one ultrasound pulse having a pulse length less than about 2.0 centimeters in the contents of the container.

6. The method of claim 5 wherein receiving the second response includes receiving a time series corresponding to ultrasound pulses reflected from the intersection of the upper surface and a sidewall of the container.

7. The method of claim 1 further comprising:

repeating the interrogating and receiving to determine a time series of values corresponding to the height; and determining fill level based on a weighted average of the time series.

8. The method of claim 1 wherein the interrogating includes transmitting an ultrasound signal having encoded information, the method further comprising cross-correlating at least one of the received first and second responses with the transmitted ultrasound signal to determine time-of-flight of the ultrasound along at least one acoustic path through the contents of the container.

9. The method of claim 8 wherein ultrasound having different encoded information is transmitted in different directions.

10. The method of claim 1 wherein the one or more ultrasonic transducers includes a multi-element transducer, the multi-element transducer including a plurality of transducer elements contained in a common housing wherein the plurality of transducer elements are adapted to transmit ultrasound in different non-parallel directions and wherein the interrogating includes sequentially transmitting ultrasound in the different directions with the plurality of transducer elements.

11. The method of claim 10 wherein the value corresponding to the height of the upper surface is determined from a known horizontal dimension of the container, a determined value corresponding to an ultrasound time-of-flight, and a determined value corresponding to a number of intermediate sidewall reflections of received ultrasound.

12. The method of claim 1 wherein the interrogation occurs at a frequency of less than about 20 kHz.

13. The method of claim 1 further comprising mechanically coupling the one or more transducers to the exterior of the container.

14. The method of claim 13 wherein the transducers are fastened to the container after the container is filled with a liquid.

15. The method of claim 14 further comprising removing the one or more transducers and monitoring the level of a different container with the transducers.

16. The method of claim 13 wherein the transducers are integrally formed with a sidewall of the container prior to the container being filled with a liquid.

17. The method of claim 1 further comprising displaying an indication of a determined liquid level in human readable form.

18. The method of claim 1 further comprising transmitting determined fill level information to a remote location.

19. The method of claim 1 wherein the first and second responses are received by different ones of a plurality of transducer elements contained in a common housing.

20. A system comprising:
one or more ultrasound transducers acoustically associated with a sidewall of a container at a first location below the upper surface of a liquid in the container, wherein the one or more transducers are positioned to interrogate the liquid with ultrasound and to receive at least a first and second response to the interrogating, the first response corresponding to ultrasound reflected from an opposite sidewall along a generally horizontal acoustic path through the liquid, the second response corresponding to ultrasound reflected from an intersection between the upper liquid surface and a sidewall of the container along a generally inclined acoustic path through the liquid; and
a processing device receiving signals from the transducers corresponding to the first and second responses and programmed to determine a value corresponding to height of the upper liquid surface relative to the first location from the received signals.

21. The system of claim 20 wherein the one or more transducers includes a multi-element transducer, the multi-element transducer including a plurality of transducer elements contained in a common housing wherein the plurality of transducer elements are adapted to transmit ultrasound in different non-parallel directions.

22. The system of claim 21 wherein the multi-element transducer includes three or more transducer elements in the common housing adapted to transmit ultrasound in three different non-parallel directions.

23. The system of claim 22 wherein a transducer element adapted to transmit ultrasound in a generally horizontal direction through the fluid is above a transducer element adapted to transmit ultrasound in an inclined direction through the fluid.

24. The system of claim 21 wherein at least one transducer element in the multi-element transducer is operable to transmit ultrasound having a divergence of at least about 15 degrees in the liquid in an inclined direction for reflection from an interface between the upper liquid surface and a sidewall of the container.

25. The system of claim 20 wherein the transducers are mounted to the exterior of the container.

26. The system of claim 25 wherein the container is substantially cylindrical.

27. The system of claim 20 wherein the processing device is programmed to determine fill level as a statistical aggregation of a series of fill level estimates.

28. The system of claim 27 wherein the processing device is programmed to weight the series of fill level estimates based on one or more of signal to noise ratio and time.

29. A system comprising:
a housing containing a plurality of ultrasound transducer elements wherein the housing is adapted to be acoustically coupled to an exterior sidewall of a fluid container with the transducer elements in acoustic communication with the interior of the container;
wherein, when the housing is acoustically coupled to the exterior sidewall of the fluid container at a housing location below an upper liquid surface of liquid in the container, a first transducer element is operable to transmit and receive ultrasound in a generally horizontal direction and at least one second transducer element is operable to transmit and receive ultrasound in a generally inclined direction; and
a processing device in communication with the first and second transducer elements configured to receive outputs therefrom and to determine a value corresponding to height of the upper liquid surface above the housing location from values corresponding to first and second ultrasonic times-of-flight, the first ultrasonic time-of-flight being of ultrasound reflected from an opposite side wall of the container and the second time-of-flight being of ultrasound reflected from the intersection between the upper liquid surface and a sidewall of the container.

30. A method for determining the level of liquid in a container comprising:
determining a first value corresponding to a first ultrasonic time-of-flight for ultrasound that travels along a generally horizontally acoustic path through the liquid;
determining a second value corresponding to an ultrasonic time-of-flight for ultrasound that travels along an inclined acoustic path through the liquid, reflects from an intersection between an upper liquid surface and a sidewall of the container, and is received at a first location below the upper liquid surface;
from the first and second values, determining a third value corresponding to a height of the upper liquid surface relative to the first location.

31. A method for determining the level of liquid in a container comprising:

interrogating a container of liquid with ultrasound with an interrogation device in acoustic contact with the liquid at a first location below an upper surface of the liquid;

receiving a response to the interrogating, from the received response, determining a first value corresponding to an ultrasonic time-of-flight for an acoustic path between the first location and an intersection between the upper liquid surface and a sidewall of the container;

determining a value corresponding to a relative height of the upper surface of the liquid from the first value.

32. A system comprising:

a housing containing at least first and second ultrasound transducer elements operable to receive ultrasound propagating in first and second different direction wherein the housing is adapted to be acoustically coupled to an exterior sidewall of a container with the transducer elements in acoustic communication with the interior of the container; and a processing device in communication with the first and second transducer elements for receiving outputs therefrom;

the processing device including programming instructions to determine a second value corresponding to an ultrasonic time-of-flight for an acoustic path between the second transducer element and an intersection between the liquid surface and a sidewall of the container and to determine a relative height of a liquid surface in the container from the second value and a first value corresponding to a horizontal dimension of the container.

33. The system of claim 32 wherein the processing device includes programming instructions to determine the first value corresponding to a horizontal dimension of the container from an ultrasonic time-of-flight measured with the first transducer element.

34. A fill level monitoring apparatus adapted to monitor the height of contents in a container comprising:

ultrasound generating means, an ultrasonic receiver, and signal processing means adapted to receive signals from the receiver, wherein the signal processing means is configured to identify a first signal corresponding to a first ultrasonic wave that has traveled through the contents of the container to the receiver independently of the height of the contents in the container, and a second signal corresponding to a second ultrasonic wave that has been reflected from an interface between the upper surface of the contents in the container, the environment above the contents, and a sidewall of the container, and wherein the signal processing means uses the transit times for the two waves to provide an indication of the level of the contents in the container.

* * * * *